United States Patent

[11] 3,603,417

| | | |
|---|---|---|
| [72] | Inventor | Hilton J. Wachholz<br>2460 Medina Ave., Columbus, Ohio 43211 |
| [21] | Appl. No. | 885,457 |
| [22] | Filed | Dec. 16, 1969 |
| [45] | Patented | Sept. 7, 1971 |

[54] WEIGHING APPARATUS FOR WHEELED VEHICLES
9 Claims, 4 Drawing Figs.

[52] U.S. Cl. .................................................. 177/126, 177/146
[51] Int. Cl. ...................................................... G01g 21/00
[50] Field of Search ............................................ 177/126, 146, 168, 169, 225, 208

[56] References Cited
UNITED STATES PATENTS

| 603,937 | 5/1898 | Bradley .......................... | 177/146 |
| 1,012,632 | 12/1911 | Groome ......................... | 177/146 |
| 2,806,686 | 9/1957 | Miller, Jr. ...................... | 177/146 |
| 2,909,367 | 10/1959 | Goehrig, Jr. et al. ........... | 177/146 |
| 3,200,897 | 8/1965 | Gibbons ........................ | 177/126 |
| 3,433,314 | 3/1969 | Peterson ....................... | 177/126 X |

FOREIGN PATENTS

| 257,803 | 3/1965 | Australia ....................... | 177/225 |

Primary Examiner—Richard B. Wilkinson
Assistant Examiner—George H. Miller, Jr.
Attorney—Mahoney, Miller & Stebens ABSTRACT: A weighing apparatus is provided for determining the weight of an object by lifting and supporting the object on a fluid-pressure-responsive sensing unit having a direct-reading visual weight indicator. The apparatus structure includes the sensing unit carried by a parallelogram linkage mounted on a support strut and a force-multiplying actuating lever connected to the linkage. Forming the sensing unit is a fluid-filled cylinder having a piston slideably mounted therein and a fluid pressure gage in communication with the cylinder. A contact shoe pivotally mounted on the sensing unit overlies the piston and prevents application of lateral forces to the piston which could result in binding as a consequence of the slight lateral displacement of the sensing unit during a lifting operation.

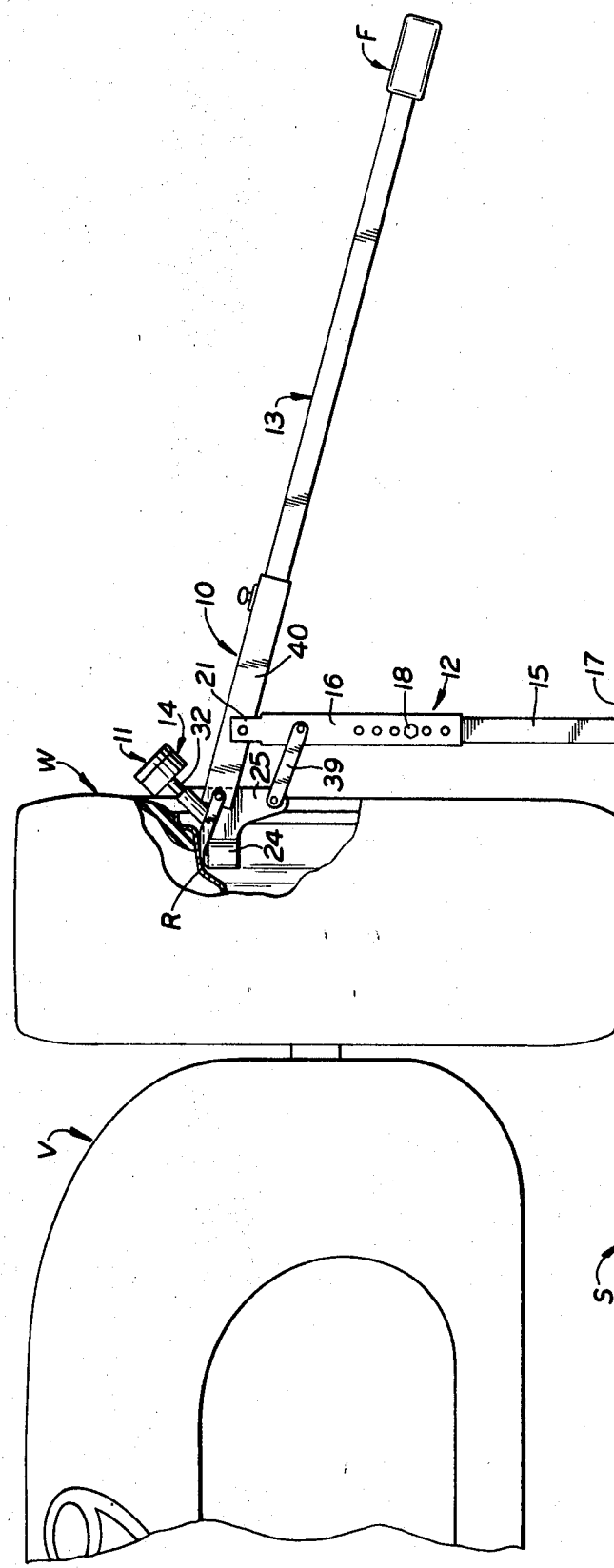
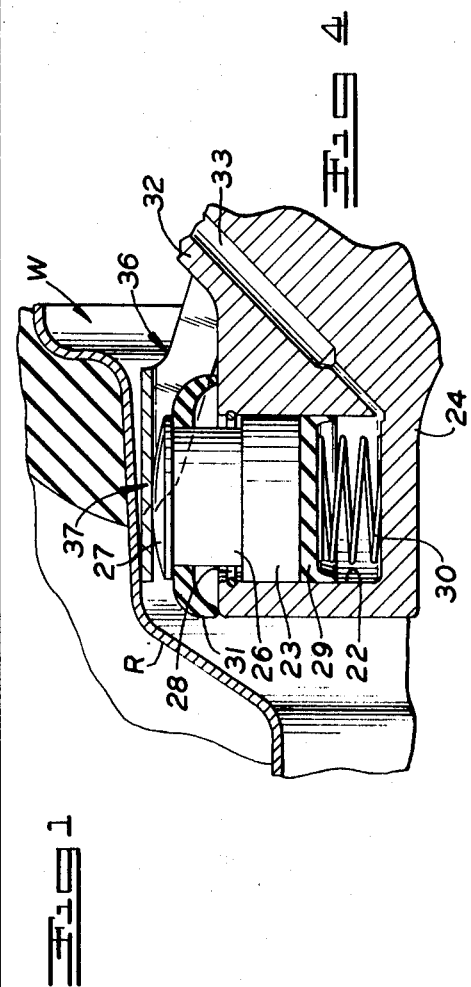

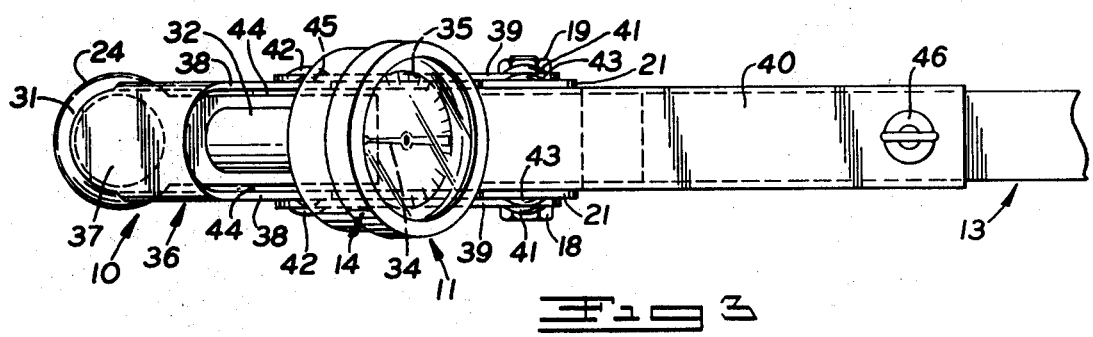
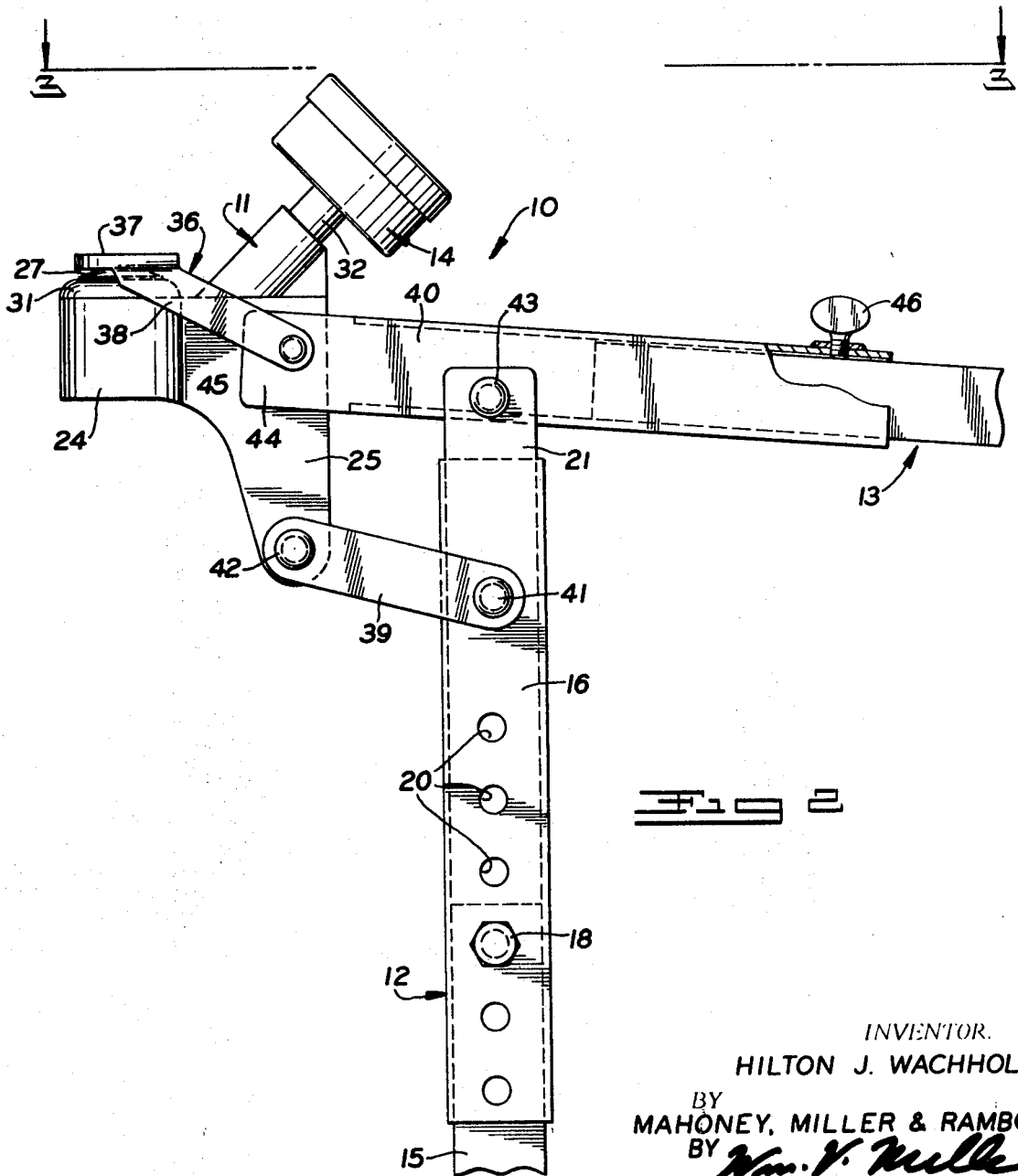

WEIGHING APPARATUS FOR WHEELED VEHICLES

BACKGROUND OF THE INVENTION

In the field of automotive racing, it is essential that the vehicle weight be accurately determined at each of the wheels in order that appropriate weight adjustments, if necessary, may be made with respect to each wheel. For particular driving or track conditions it is often essential that the individual wheel weights be adjusted to a relatively unbalanced condition. This weight adjustment may be accomplished by shifting of components or the appropriate positioning of auxiliary weights within the vehicle.

Prior art apparatus utilized for this purpose usually comprises conventional scale devices such as mechanical lever-type platform scales. This type of weighing device has not been found satisfactory in that they are inconvenient to use as it is necessary to either drive a vehicle wheel onto the scale platform or to first elevate the wheel by auxiliary jack means to permit positioning of the scale under the wheel. In addition, the vertical elevation of the wheel necessary to position the scale which is of a substantial thickness under the wheel affects the accuracy of the weight reading.

BRIEF DESCRIPTION OF THE INVENTION

The weighing apparatus of this invention permits the weight of the vehicle as supported by each wheel to be conveniently ascertained and with a relatively high degree of accuracy. Design of the lever mechanism permits the sensing unit to engage a wheel rim at an uppermost point and thus avoids any other manipulation of the vehicle which would detract from the simplicity and ease of operation of this apparatus. Since the apparatus does not require and does not result in excessive vertical lifting of a wheel, errors due to this factor are avoided. It is only necessary to vertically lift the wheel where the bottom peripheral portion of the tire is out of contacting engagement with the roadway surface. The particular construction of the fluid-pressure-responsive sensing unit in combination with the contact shoe substantially eliminates undesireable binding forces on the piston thereby enhancing the accuracy of the weight indication. This lever design also permits construction of a rugged apparatus which is relatively lightweight and is readily portable.

These and other objects and advantages of this invention will be readily apparent from the accompanying drawings and the following detailed description of an embodiment thereof.

DETAILED DESCRIPTION OF INVENTION

In the drawings

FIG. 1 is a side elevational view of a weighing apparatus embodying this invention and shown in operative engagement with a vehicle wheel for a weighing operation.

FIG. 2 is a fragmentary side elevational view of the apparatus of FIG. 1 but on an enlarged scale.

FIG. 3 is a fragmentary top plan view of the weighing apparatus as viewed from a plane lying along lines 3—3 of FIG. 2.

FIG. 4 is a fragmentary vertical sectional view taken along a medial longitudinal plane on an enlarged scale and in operative engagement with a vehicle wheel rim.

Having reference to the drawings, a weighing apparatus 10 embodying this invention is shown in FIG. 1 as utilized in determining the weight of a vehicle V as supported by one wheel W. The apparatus comprises a sensing unit 11 connected by a parallelogram linkage with a support strut 12 and a lever arm 13 facilitating the operation thereof. For operation of the apparatus 10 in determining the weight of a vehicle V as supported by a wheel W, the apparatus is positioned relative to the wheel as shown with the sensing unit 11 disposed in supporting engagement with an uppermost portion of the wheel rim R. When thus positioned, a force F is applied by the operator to the outer end of the lever arm 13 in the indicated direction to vertically lift the wheel W until it clears the road surface S thereby assuring that the wheel weight will be fully carried by the apparatus and assure accurate determination of weight. The weight is visually ascertained from an indicating device 14 associated with the sensing unit 11.

The vertical support strut 12 which is also shown in FIG. 2 and in further detail comprises two elongated tubes 15 and 16 adapted to telescope together in relative axially sliding movement providing height adjustment to accommodate various sized vehicle wheels. Each section 15, 16 is of square cross section with a flat load bearing plate 17 secured to the lower end of the bottom section 15 and sized to adequately distribute the load over the underlying road surface S. A readily removable fastening device such as a bolt 18 and nut 19 is insertable through an aperture formed in the upper end portion of strut section 15 and a selected pair of aligned holes 20 formed in the lower end portion of strut section 16. A series of such pairs of holes 20 are formed to provide the desired degree of vertical height adjustment within the height range of the strut. The bolt 18 may also be removed to permit disassembly of the strut 12 thus resulting in more convenient packaging and storage. The strut is of a length designed to place the parallelogram linkage in a horizontal configuration for optimum vertical lift capability. A pair of axially projecting parallel spaced ears 21 are formed with the strut section 16 at the upper end thereof to facilitate interconnection with the linkage.

Determination of the wheel-supported vehicle weight is accomplished by the sensing unit 11. In accordance with this invention, the sensing unit is fluid pressure responsive to provide a relatively high degree of accuracy and comprises a fluid filled cylinder 22 having a piston 23 slideably disposed therein. The cylinder 22 is formed in a body structure 24 which may be advantageously formed by appropriate metal casting procedures and includes a vertical edge portion 25 facilitating interconnection with the parallelogram linkage. Formed with the piston 23 is a reduced diameter rod portion 26 which is of a length to project a distance axially outward of the cylinders and which terminates in a contact head 27 having a convex, conical surface. Disposed in a groove formed in the wall of the cylinder 22 adjacent the outer end is a retainer ring 28 which prevents removal of the piston. A resilient seal element 29 of cupform is disposed in the cylinder 22 adjacent the head end of the piston to form a fluidtight seal and a compression spring 30 is also disposed in the cylinder bearing against the closed cylinder end and the seal 29 to bias the piston 23 and rod 26 to an extended position restrained only by the retainer ring 28. A flexible diaphragm-type dust seal 31 is also provided around the exposed portion of the rod 26 and seals with the body structure 24 about the open end of the cylinder 22. The indicating device 14 comprises a fluid pressure gage having a fluid port connector 32 in fluid communication with a passageway 33 connecting with the lower end of the cylinder 22 and the fluid is preferably a suitable liquid to avoid compressibility error. Such a gage is provided with a movable pointer 34 which registers with graduated scale face 35 with the device appropriately calibrated to provide a direct visual indication of the weight in the desired weight units.

The sensing unit 11 is also provided with a contact shoe 36 which substantially prevents transmission to the piston 23 of lateral forces resulting from the vertical lifting characteristics of a parallelogram linkage. Such a linkage in effecting vertical lift also produces a slight lateral or horizontal force applied to the end of the piston rod if the wheel rim R rests directly on the contact head 27. A lateral force would result in relatively high error producing frictional force due to binding between the piston and cylinder wall unless the piston were extremely long to accommodate the applied eccentric force. Compactness of the sensing unit 11 is obtained as a consequence of the incorporation of the contact shoe 36 which comprises a horizontal contact plate 37 disposed in overlying relationship to the piston contact head with the wheel rim R thus bearing against the upper surface of the plate. Formed with the plate 37 at a diametrical sides are a pair of spaced parallel, elongated arms 38 which project a distance laterally from the plate. The arms 38 extend along opposite vertical sides of the edge portion 25 of the body structure and the terminal end portions are pivotally connected to the body for swinging movement in a vertical plane. Any lateral force-producing lateral movement of the wheel rim R relative to the contact shoe plate 37 will be resisted by the contact shoe arm 38 through their pivot connection with the body structure 24 and will not be transmitted to the piston contact head 27. Thus it will be readily seen that the contact shoe 36 prevents transmission of binding forces to the piston 23.

Interconnecting the sensing unit 11 with the strut 12 at the upper end of section 16 is the parallelogram linkage which, as can be best seen in FIG. 2, comprises first and second elements 39 and 40 disposed in generally horizontal, superposed relationship. Element 39 includes two elongated links which are positioned at opposite sides of strut section 16 and edge portion 25 of the sensing unit 11 and are pivotally connected thereto at respective ends by pivot pins 41 and 42. Element 40 which is above element 39 is formed from an elongated section of square cross section tube. This tubular element extends between the upwardly projecting ears 21 of the strut section 16 and is pivoted thereto by a pin 43. Pin 43 projects through a bearing aperture formed in the element 40 at a point intermediate the ends and adjacent the lower side. The two vertical sides of the tubular element project a distance axially outward at one end forming a pair of lugs 44 to receive the edge portion 25 of sensing unit and are pivotally connected therewith by a pivot pin 45. Pivot pin 45 extends through apertures formed in the upper marginal edge portion of the lugs 44 for optimum strength and maintain the required pivot point relationship for functioning of the parallelogram linkage. Swinging movement of the element 40 in a vertical plane will thus produce vertical displacement of the sensing unit 11 and maintain the cylinder 22 and piston in alignment with a vertical axis during a wheel lifting and weighing operation.

The force F required for lifting is applied through the lever arm 13 which provides the necessary force multiplication. Lever arm 13 is formed of an elongated square cross section tube which may be telescopically inserted into the end of linkage element 40. A thumb screw 46 threaded through a wall of the tubular element 40 releaseably secures the lever arm 13 to the linkage permitting removal for more convenient packaging and storage.

Operation of the weighing apparatus illustrated and described in detail has been described and is clearly apparent. Optimum accuracy is obtained by positioning the supporting strut 12 as nearly vertical as possible and the lifting movement is minimized by adjusting the vertical height to position the linkage elements as nearly horizontal as possible.

It will be readily apparent from the foregoing detailed description that a weighing apparatus is provided which may be conveniently utilized to independently and accurately weigh a vehicle as at each wheel. The apparatus is simple to operate and may be easily disassembled or assembled to facilitate packaging and storage.

Having thus described this invention, what is claimed is:

1. Weighing apparatus comprising a vertically positionable, elongated support strut;
    a fluid-pressure-responsive sensing unit having a fluid cylinder, a piston slideably disposed in said cylinder for relative displacement along an axis thereof, an object-engageable element and an indicating device providing an indication of a force applied to said cylinder and piston;
    a parallelogram linkage pivotally interconnecting with said strut and said sensing unit for support of said sensing unit with the axis of the cylinder parallel to said strut in laterally offset relationship and maintaining said cylinder axis parallel to said strut during vertical displacement of said sensing unit; and a lever arm connected with said linkage to provide mechanical advantage to an operator of the apparatus in actuating said linkage to effect displacement of said sensing unit.

2. Weighing apparatus according to claim 1 wherein said strut comprises first and second telescoping sections relatively adjustable providing vertical height adjustability, said sections having means rigidly interconnecting said sections at selected heights.

3. Weighing apparatus according to claim 1 wherein said sensing unit indicating device comprises a fluid pressure gage connected to said cylinder whereby a force applied to said piston produces a fluid pressure actuating said indicating device.

4. Weighing apparatus according to claim 3 wherein said indicating device includes a movable indicator responsive in predetermined relationship to fluid pressure in said cylinder and a scale calibrated to provide a visual indication of object weight in predetermined units.

5. Weighing apparatus according to claim 1 wherein said parallelogram linkage includes first and second elements pivotally interconnected with said strut and said sensing unit, said elements comprising elongated members generally horizontally disposed in superposed relationship.

6. Weighing apparatus according to claim 5 wherein said lever arm is connected with and forms an extension of one of said elongated members and projects oppositely from said strut relative to said sensing unit.

7. Weighing apparatus according to claim 1 wherein said cylinder and piston are disposed with said piston uppermost and having an upper end adapted to support said object-engageable-element thereon.

8. Weighing apparatus according to claim 7 wherein said object-engageable-element includes a contact shoe having a horizontal contact plate disposed in overlying relationship to the upper end of said piston and adapted to support an object thereon, said contact shoe being pivotally mounted for swinging movement in a vertical plane.

9. Weighing apparatus according to claim 7 wherein said sensing unit includes a compression spring disposed in said cylinder and biasing said piston to an extended position.